E. T. FORD.
Harvester Rake.
No. 18,686.  Patented Nov. 24, 1857.
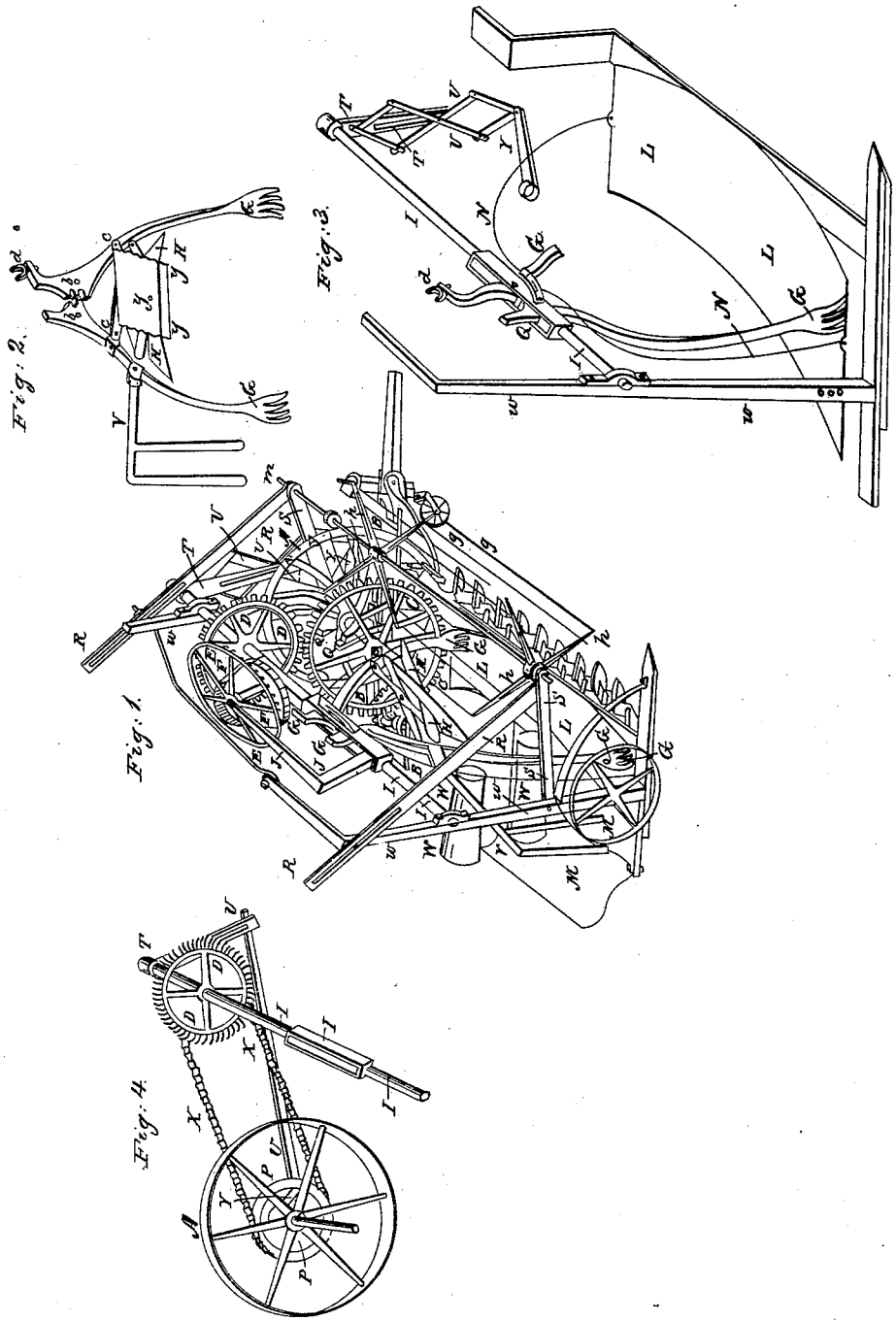

UNITED STATES PATENT OFFICE.

ELIAS T. FORD, OF BATAVIA, NEW YORK.

IMPROVED HARVESTER-RAKE.

Specification forming part of Letters Patent No. 18,686, dated November 24, 1857.

*To all whom it may concern:*

Be it known that I, ELIAS T. FORD, of the town of Batavia, county of Genesee, State of New York, have invented a new and useful Improvement in Harvester-Rakes; and I do hereby declare the following is a clear and exact description of the same, reference being had to the accompanying drawings, letters of reference marked thereon making a part of this specification, in which—

Figure 1 is a perspective view, and Figs. 2, 3, and 4 are detached sections, of the same, showing a certain part of the raking apparatus more distinctly, like letters referring to like parts in all the figures.

Fig. 1 is a view of the machine as arranged for harvesting, with the raking apparatus attached, viz: A is the master or driving wheel; B B, the frame; Q Q, the axle-arms. There are different orifices within the axle-arms, used for adjustment, and made particularly for mowing. The raking apparatus, viz: I I is the rock-shaft, to which the gathering-arms G G, levers V, combined levers H H, folding canvas *y y*, mortised lever T, driving-levers U U, crank Y, bent arm O O, wire bail N N, spring-platform L L, pinion D D, horizontal pinion E E, cam F, driving-lever *v v*, open-link chain X X are attached directly and indirectly, as represented in Figs. 1, 2, 3, and 4, and upon the left arm G is inserted the friction-box *d*, as seen in Fig. 2, in which works the cam F, as seen in Fig. 1. The combined levers H H, canvas *y y* of which I term the "grain-divider," are located upon the arms G G, and said arms are inserted within the mortise O O of rock-shaft I I, so that the cogs upon said arms G G are connected and retained, as seen in Fig. 2, orifices being made at the center cog and corresponding cavity of the opposite arm G, as seen at *b b*, for the perfect and joint operation of the same. The mortise-lever T is connected to the axle of driving-wheel A by the driving-levers U U and crank Y, as seen in Fig. 3, or may be by the connecting-bar *v v* when the rock-shaft is placed farther forward of the master-wheel A, as seen in Fig. 4, and at the same time connecting the pinion D D and master-wheel by the chain X X, running over pulleys P P, attached to each, as seen in Fig. 4. The compound removing-lever N is attached to the arm G, as seen in Figs. 2 and 1. The rock-shaft I I, with its attachment, is located within its bearings upon the standards *w w w w*, one of which rests upon the base of cutter-bar at the right and the left standard upon the frame B B. The cam F is located, together with the horizontal pinion E E, upon the rock-shaft and the flange of the cam resting within the friction-box *d*, as seen by Fig. 1, and I support the said attachments on the rock-shaft by the bent brace or arm J J. The pinion D D is located upon the rock-shaft I I so as to mesh into the pinion C C, also into the horizontal pinion E E, and the said shaft I I being its axis of motion, the pinion C C is located upon the axle of master-wheel A, which communicates the motion to the raking apparatus from the said master-wheel, or by the open-link chain, as seen by Fig. 4. The bent arm *o o* passes through the rock-shaft I I and right arm, G, and a mortise being within the said arm, through which the wire bail N N is inserted and attached to each end of the platform L L, as seen in Fig. 3, the pinion E E. Arms G G have two motions—a horizontal and rocking, as that of the cam F and rock-shaft I I. The flange of the cam F is so constructed as forming two circles from one center, for the purpose of opening and closing the arms G G, and holding the said arms open and closed during the revolution of the crank Y. The combined levers H H and canvas *y y* are attached to the gathering-arms G G at the points C C, as seen in Fig. 2.

Operation: As the combined arrangements of the harvester, as seen in Fig. 1, are set in motion, and as the crank Y and pinion C C are connected to the axle of the master-wheel A and the same said crank to the rock-shaft I I, as above described, thereby giving a rocking movement to the rock-shaft I I, with all its attachments, and as the pinion C C meshes into the pinion D D and D D into the horizontal pinion E E, thereby moving the said pinion E E, together with the cam F, causing the vibration of gathering-arms G G, elevating and depressing the combined levers H H, together with the folding canvas *y y*, also moving the compound lever V'. In Fig. 1 the gathering-arms G G are opened and in the act of closing. The ends of the spring-platform L L are elevated by the wire bail N N to the circle described by the movement of gathering-arms G G, and as the same is made to close, as before described, gathering the cut and falling grain upon the platform L L, retaining the same and removing the gavel W, thus gathered to the rear, and the arms G G then open and deposit the same upon the stationary platform W W, and the said arms continue to move forward until they reach nearly to the front edge of the spring-platform L L, and then close or gather the second gavel, as before stated, and at this moment the combined levers H H and folding canvas $y\,y$ drop and effect a perfect and sudden division of that portion of grain gathered from that being brought in by the reel, and at the same time preventing all driveling of the grain. Moreover, at the second closing of the grain-gathering apparatus the gavel-remover V removes the previous deposited gavel W to the left, as seen in Fig. 1, and by letters W W. The said lever or gavel remover V moves with and in connection with the grain-gathering arms G G, and together repeats the same operation, and as the same arms, G G, are removed to the rear the wire bail N N relieves the spring-platform L L, and the same conforms to the horizontal surface of the cutter-bar. The grain-divider is caused to be elevated and lowered by the peculiar arrangement and attachment to and movement of the arms G G, as before described.

The folding canvas $y\,y$ is attached to wooden arms, and the said arms are attached to the center bolts of the levers H H, as seen in Fig. 2. The operation and movement of the raking apparatus are the same in effect given as represented in Fig. 4 as that in Fig. 1, or may be operated by any other similar device when the movement is taken from the master-wheel or driving-wheel A, and thus are the functions of the grain-gathering apparatus, as described—viz., the levers H H, arms G G, operating the spring-platform L L by the connection of the wire bail N N and bent arms O O, cam F, the connection of the horizontal pinion E E to the bevel-pinion D D—the same with and in connection of other parts of the machine, as before described and otherwise illustrated by drawings.

What I claim, and desire to secure by Letters Patent, is—

The gathering-arms G G, in combination with the spring-platform L L, grain-divider H H $y$, and gavel-remover V, the whole being arranged in relation to and operated by the rock-shaft I and cam F, substantially as and for the purpose above set forth.

ELIAS T. FORD.

Attest:
M. W. HEWETT,
W. G. LOCKE,
C. U. SCHUYLER.